(12) United States Patent
Takahashi et al.

(10) Patent No.: US 10,145,468 B2
(45) Date of Patent: Dec. 4, 2018

(54) CONTROL DEVICE AND CONTROL METHOD FOR DUAL CLUTCH-TYPE TRANSMISSION

(71) Applicant: ISUZU MOTORS LIMITED, Tokyo (JP)

(72) Inventors: Yusuke Takahashi, Fujisawa (JP); Tomoaki Shimozawa, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 69 days.

(21) Appl. No.: 15/517,393

(22) PCT Filed: Oct. 1, 2015

(86) PCT No.: PCT/JP2015/077949
§ 371 (c)(1),
(2) Date: Apr. 6, 2017

(87) PCT Pub. No.: WO2016/056461
PCT Pub. Date: Apr. 14, 2016

(65) Prior Publication Data
US 2017/0307068 A1 Oct. 26, 2017

(30) Foreign Application Priority Data

Oct. 6, 2014 (JP) ................................. 2014-205602

(51) Int. Cl.
*F16H 61/02* (2006.01)
*F16H 61/688* (2006.01)
(Continued)

(52) U.S. Cl.
CPC ......... *F16H 61/0206* (2013.01); *F16H 3/006* (2013.01); *F16H 3/093* (2013.01);
(Continued)

(58) Field of Classification Search
None
See application file for complete search history.

(56) References Cited

U.S. PATENT DOCUMENTS

2004/0166990 A1   8/2004   Buchanan et al.
2004/0166991 A1   8/2004   Buchanan et al.
(Continued)

FOREIGN PATENT DOCUMENTS

CN         1526976 A      9/2004
CN       101173711 A      5/2008
(Continued)

OTHER PUBLICATIONS

Extended European Search Report for EP App No. 15848750.4 dated May 4, 2018, 9 pgs.
(Continued)

*Primary Examiner* — Ramya P Burgess
*Assistant Examiner* — Timothy Hannon
(74) *Attorney, Agent, or Firm* — Procopio, Cory, Hargreaves & Savitch LLP

(57) ABSTRACT

A dual clutch-type transmission control device is provided which improves the accuracy with which transmission torque is learned. A dual-clutch transmission includes a clutch apparatus having a first clutch and a second clutch, a first input shaft, a second input shaft, a counter shaft, an output shaft, an auxiliary transmission portion including a first input gear pair and a second input gear pair, a main transmission portion including an output gear pair, and learning modules and the learning modules shift the main transmission portion into a neutral state, disengage both the first and second clutched generate a torque change in an engine by keeping the engine running at a predetermined revolution number, engaging partially one of the first and second clutches and thereafter engaging the other clutch
(Continued)

gradually partially and learn an amount of change of torque associated with the torque change as transmission torque of the other clutch.

5 Claims, 3 Drawing Sheets

(51) Int. Cl.
*F16H 3/00* (2006.01)
*F16H 3/093* (2006.01)
*F16H 61/00* (2006.01)
*F16H 3/091* (2006.01)

(52) U.S. Cl.
CPC ....... *F16H 61/0251* (2013.01); *F16H 61/688* (2013.01); *F16D 2500/50245* (2013.01); *F16H 3/00* (2013.01); *F16H 3/0915* (2013.01); *F16H 61/00* (2013.01); *F16H 2061/0087* (2013.01); *F16H 2200/0052* (2013.01); *F16H 2342/04* (2013.01)

(56) References Cited

U.S. PATENT DOCUMENTS

| | | |
|---|---|---|
| 2004/0172184 A1 | 9/2004 | Vukovich et al. |
| 2006/0207365 A1 | 9/2006 | Baldwin |
| 2007/0051196 A1 | 3/2007 | Baldwin |
| 2009/0145253 A1 | 6/2009 | Katakura et al. |
| 2013/0190134 A1 | 7/2013 | Mair |
| 2014/0148304 A1 | 5/2014 | Pietron et al. |
| 2014/0150584 A1 | 6/2014 | Terashima |
| 2015/0024904 A1 | 1/2015 | Pietron et al. |

FOREIGN PATENT DOCUMENTS

| | | |
|---|---|---|
| CN | 101451594 A | 6/2009 |
| CN | 102192282 A | 9/2011 |
| CN | 103649600 A | 3/2014 |
| CN | 103836183 A | 6/2014 |
| DE | 102010041303 A1 | 3/2012 |
| GB | 2478785 A | 9/2011 |
| JP | 2011-173519 A | 9/2011 |
| JP | 2011-236946 A | 11/2011 |
| JP | 2012-057706 A | 3/2012 |

OTHER PUBLICATIONS

International Search Report and Written Opinion for PCT App No. PCT/JP2015/077949 dated Jan. 12, 2016, 6 pgs.

Office Action for related Chinese Patent Application No. 201580054240. 2, dated Jan. 3, 2018; 11 pages. English translation provided.

CONTROL DEVICE AND CONTROL METHOD FOR DUAL CLUTCH-TYPE TRANSMISSION

CROSS-REFERENCE TO RELATED APPLICATIONS

This application is a U.S. National Stage entry of PCT Application No. PCT/JP2015/077949, filed on Oct. 1, 2015, which claims priority to Japanese Patent Application No. 2014-205602, filed Oct. 6, 2014, the contents of which are incorporated herein by reference.

TECHNICAL FIELD

The present invention relates to a control device and control method for dual clutch-type transmission and more particularly to the learning of the transmission torque of a clutch.

BACKGROUND ART

Conventionally, there have been known dual clutch-type transmissions in which a dual clutch apparatus having two clutches is provided between an engine and a transmission so as to provide the transmission with two power transmission paths. In automatic transmissions including a dual clutch apparatus, it is preferable to learn the transmission torque of a clutch to deal with the deterioration with age of a clutch, a variation in quality of clutches produced, and changes in environment such as the temperature of a hydraulic fluid (for example, refer to Patent Literatures 1, 2).

PRIOR ART LITERATURE

Patent Literature

Patent Literature 1: JP-A-2012-57706
Patent Literature 2: JP-A-2011-236946

SUMMARY OF THE INVENTION

Problem that the Invention is to Solve

In general, as a method of learning the transmission torque of a clutch, there are known two methods which will be described below. (1) A method of estimating and learning the transmission torque of a clutch based on a clutch engagement starting point which is obtained from a change in rotation number on an output side of the clutch by engaging the clutch gradually after gears of a transmission is shifted into a neutral state. (2) A method of learning the transmission torque based on engine torque obtained with the clutch partially engaged as a result of the clutch being engaged gradually in such a state that a driver shifts a transmission into a predetermined gear and applies the brakes to stop a vehicle.

In the method described under (1) above, although the learning can be executed without requiring the driver to apply the brakes, since the transmission torque is estimated indirectly from the clutch engagement starting point without directly measuring the transmission torque, there is caused a problem that the deterioration with age of the clutch and the change in characteristics of the clutch cannot be dealt with. In addition, since the transmission torque is estimated based only on one point which is the clutch engagement starting point, there is a possibility that the learning accuracy cannot be ensured.

On the other hand, in the method described under (2) above, since the transmission is shifted into the predetermined gear in the midst of execution of the learning, the driver needs to apply the brakes or the parking brake in order to prevent the start of the vehicle, leading to a possibility that the safety cannot be ensured.

The invention has been made in view of the situations described above and an object thereof is to improve the accuracy of learning the transmission torque of a clutch effectively.

Means for Solving the Problem

With a view to achieving the object, according to the invention, there is provided a control device for a dual clutch-type transmission including a clutch apparatus having a first clutch and a second clutch which can connect and disconnect a torque transmission from a drive source to a transmission, a first input shaft which is connected to the first clutch, a second input shaft which is connected to the second clutch and which is disposed concentrically with the first input shaft, a counter shaft which is disposed parallel to the first input shaft and the second input shaft, an output shaft which is disposed parallel to the counter shaft, an auxiliary transmission portion which includes a first input gear pair which transmits torque from the first input shaft to the counter shaft and a second input gear pair which transmits torque from the second input shaft to the counter shaft, and a main transmission portion which includes at least one or more output gear pairs which can transmit torque from the counter shaft to the output shaft, the control unit characterized by including a learning module for shifting the main transmission portion into a neutral state, for disengaging the first and second clutches, for generating a torque change in the drive source by keeping the drive source revolving at a predetermined revolution number, engaging partially either the first clutch or the second clutch, and thereafter engaging gradually the other clutch until the clutch is partially engaged and for learning an amount of change of torque associated with the torque change as transmission torque of the other clutch.

The control device for the dual clutch-type transmission described above may include further a temperature sensor for detecting a temperature of a hydraulic fluid of the clutch apparatus, and a storage module for storing the temperature of the hydraulic fluid which is detected by the temperature sensor while the learning module is learning, and the learning module may learn the transmission torque change amount as transmission torque of the other clutch which corresponds to the temperature of the hydraulic fluid which is stored in the storage module.

The learning module may execute the learning of transmission torque when a distance traveled by a vehicle reaches a predetermined upper limit distance.

According to the invention, there is provided a control method for a dual clutch-type transmission including a clutch apparatus having a first clutch and a second clutch which can connect and disconnect a torque transmission from a drive source to a transmission, a first input shaft which is connected to the first clutch, a second input shaft which is connected to the second clutch and which is disposed concentrically with the first input shaft, a counter shaft which is disposed parallel to the first input shaft and the second input shaft, an output shaft which is disposed parallel to the counter shaft, an auxiliary transmission portion which includes a first input gear pair which transmits torque from the first input shaft to the counter shaft and a second input gear pair which transmits torque from the second input shaft to the counter shaft, and a main transmission portion which includes at least one or more output gear pairs which can transmit torque from the counter shaft to the output shaft, the control method characterized by including:

shifting the main transmission portion into a neutral state and disengaging the first and second clutches;

generating a torque change in the drive source by keeping the drive source revolving at a predetermined revolution number, engaging partially either the first clutch or the second clutch, and thereafter engaging gradually the other clutch until the clutch is partially engaged; and learning an amount of change of torque associated with the torque change as transmission torque of the other clutch.

MODE FOR CARRYING OUT THE INVENTION

Figure 1:
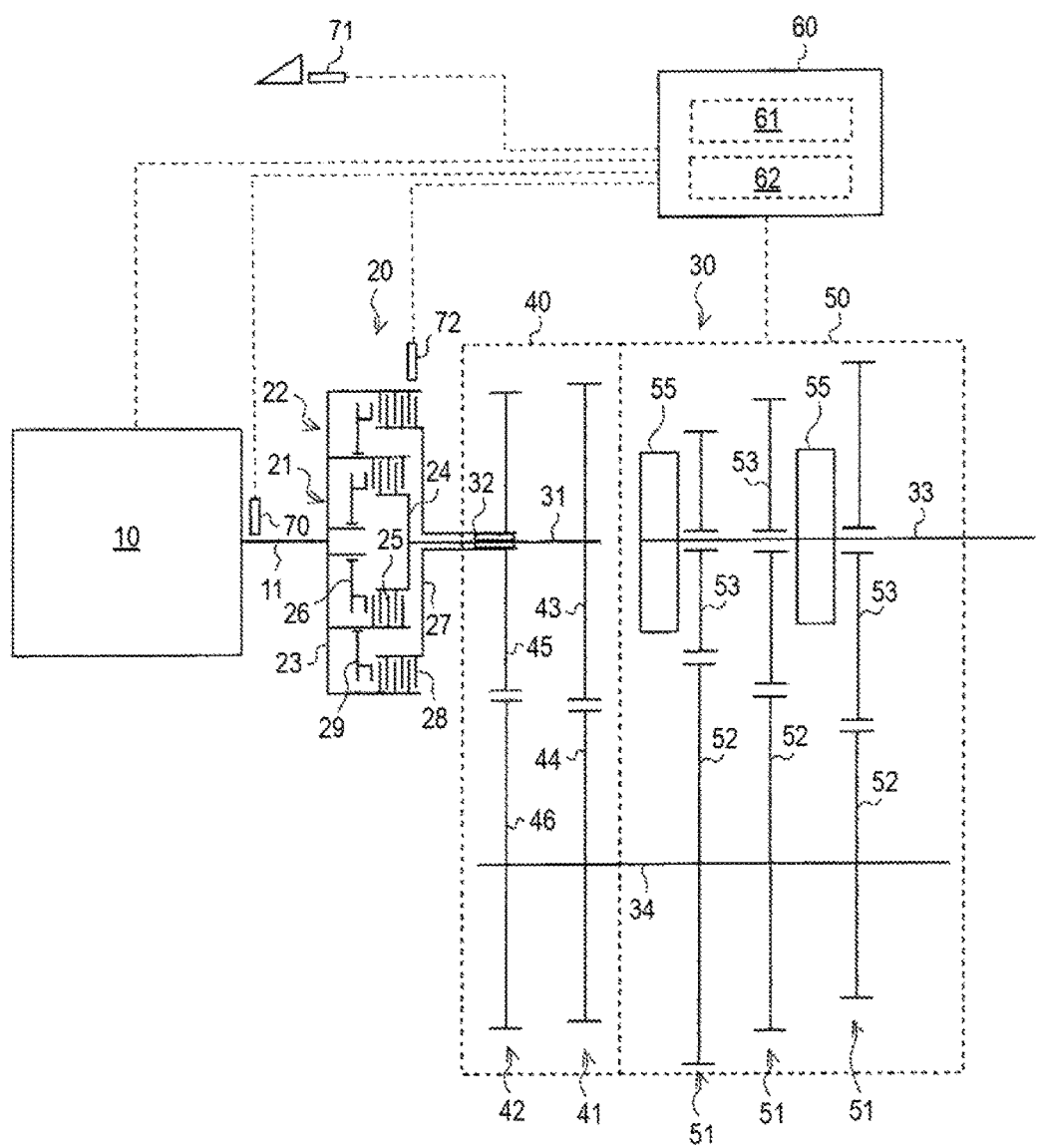
FIG. 1 is a schematic overall configuration diagram showing a dual clutch-type transmission according to an embodiment of the invention.

Hereinafter, a control device and control method for a dual clutch-type transmission according to an embodiment of the invention will be described based on the accompanying drawings. Like reference numerals will be given to like parts, and their designations and functions are alike. Therefore, detailed descriptions of such like parts will not be repeated.

FIG. 1 is a schematic overall configuration diagram showing a dual clutch-type transmission of the embodiment. In FIG. 1, reference numeral 10 denotes an engine which is a drive source, reference numeral 20 denotes a dual clutch apparatus, reference numeral 30 denotes a transmission, reference numeral 60 denotes a control unit, reference numeral 70 denotes an engine revolution number sensor, reference numeral 71 denotes an accelerator pedal position sensor, and reference numeral 72 denotes a temperature sensor for detecting a temperature of a hydraulic fluid of the dual clutch apparatus 20.

The dual clutch apparatus 20 is, for example, a wet-type multiple disc clutch apparatus and includes a first clutch 21 and a second clutch 22.

The first clutch 21 includes a clutch hub 23 which rotates together with a crankshaft (or a clutch input shaft) 11 of the engine 10, a first clutch drum 24 which rotates together with a first input shaft 31 of the transmission 30, a plurality of first clutch plates 25 and a first piston 26 which brings the first clutch plates 25 into press contact with one another. When the first piston 26 is caused to move to an output side (rightwards in FIG. 1) as part of a stroke thereof by means of a hydraulic pressure, the first clutch plates 25 are brought into press contact with one another, whereby the first clutch 21 is engaged to allow a torque to be transmitted. On the other hand, when the hydraulic pressure exerted, the first piston 26 is caused to move to an input side (leftward in FIG. 1) as part of the stroke thereof by means of the biasing force of a spring, not shown, whereby the first clutch 21 is disengaged to cut off the transmission of torque. In the following description, a state where torque is transmitted by way of the first clutch plates 25 while the clutch hub 23 and the first clutch drum 24 are rotating at different rotation numbers will be referred to as a partially engaged state of the first clutch 21.

The second clutch 22 includes the clutch hub 23, a second clutch drum 27 which rotates together with a second input shaft 32 of the transmission 30, a plurality of second clutch plates 28 and a second piston 29 which brings the second clutch plates 28 into press contact with one another. When the second piston 29 is caused to move to an output side (rightwards in FIG. 1) as part of a stroke thereof by means of a hydraulic pressure, the second clutch plates 28 are brought into press contact with one another, whereby the second clutch 22 is engaged to allow a torque to be transmitted. On the other hand, when the hydraulic pressure exerted, the second piston 29 is caused to move to an input side (leftward in FIG. 1) as part of the stroke thereof by means of the biasing force of a spring, not shown, whereby the second clutch 22 is disengaged to cut off the transmission of torque. In the following description, a state where torque is transmitted by way of the second clutch plates 28 while the clutch hub 23 and the second clutch drum 27 are rotating at different rotation numbers will be referred to as a partially engaged state of the second clutch 22.

The transmission 30 includes an auxiliary transmission portion 40 which is disposed on an input side and a main transmission portion 50 which is disposed on an output side thereof. The transmission 30 includes the first input shaft 31 and the second input shaft 32 which are provided in the auxiliary transmission portion 40, the output shaft 33 which is provided in the main transmission portion 50, and the counter shaft 34 which are disposed parallel to these shafts 31 to 33. The first input shaft 31 is inserted through a hollow shaft which passes axially through the second input shaft 32 so as to rotate relatively. A propeller shaft, not shown, is connected to an output end of the output shaft 33.

A first splitter gear pair 41 and a second splitter gear pair 42 are provided in the auxiliary transmission portion 40. The first splitter gear pair 41 includes a first input main gear 43 which is fixed to the first input shaft 31, and a first input auxiliary gear 44 which is fixed to the counter shaft 34 and which normally meshes with the first input main gear 43. The second splitter gear pair 42 includes a second input main gear 45 which is fixed to the second input shaft 32, and a second input auxiliary gear 46 which is fixed to the counter shaft 34 and which normally meshes with the second input main gear 45.

A plurality of output gear pairs 51 and a plurality of synchromesh mechanisms 55 are provided in the main transmission portion 50. The output gear pairs 51 include an output auxiliary gear 52 which is fixed to the counter shaft 34 and an output main gear 53 which is provided on the output shaft 33 so as to rotate relatively and which normally meshes with the output auxiliary gear 52. The synchromesh mechanisms 55 have a generally known construction and each include a dog clutch, not shown. The operations of the synchromesh mechanisms 55 are controlled by the control unit 60 and selectively bring the output shaft 33 and the output main gears 53 into engagement with each other or disengagement from each other (a neutral state) depending upon a shift position detected by a shift position sensor, not shown. The numbers of output gear pairs 51 and synchromesh mechanisms 55 and the layout pattern are not limited to those shown in Figure and hence can be altered as required without departing from the spirit and scope of the invention.

The control unit 60 executes various controls including the control of the engine 10, the dual clutch apparatus 20 and the transmission 30 and is made up of a known CPU, ROM, RAM, input port and output port. The control unit 60 has an engine constant revolution control module 61 and a transmission torque learning module 62 as part of its functional elements. These functional elements will be described as being incorporated in the control unit 60 which is integral hardware. However, either of the functional elements can also be provided in a separate piece of hardware.

The engine constant revolution control module 61 executes a constant revolution control to hold the revolution number of the engine 10 at a predetermined target revolution number (a constant value) when a transmission torque of a clutch is learned as will be described later. More specifically, the constant revolution control is realized, for example, by feedback controlling the fuel injection amount of the engine 10 so that an actual revolution number which is inputted from the engine revolution number sensor 70 is held at the target revolution number. Herewith, in the event that a reduction in revolution number is called for as a result of a load being applied externally to the engine 10, the fuel injection amount is increased to raise the resulting revolution number back to the target revolution number.

The transmission torque learning module 62 executes the learning of transmission torque of the first clutch 21 and the second clutch 22. Hereinafter, a detailed learning procedure of transmission torque will be described based on a flow chart shown in FIG. 2. This transmission torque learning is started in a state where no torque needs to be transmitted to a driving system of a vehicle, that is, a state where all the synchromesh mechanisms 55 of the main transmission portion 50 are disengaged (neutral state) and the first clutch 21 and the second clutch 22 are disengaged.

In step S100, it is determined whether or not a learning execution flag F to execute the transmission torque learning is set on. In this embodiment, the following conditions are set as learning execution conditions: (1) a distance traveled by the vehicle since the end of the previous learning reaches a predetermined upper limit distance which causes a change in clutch characteristics; (2) the number of times of engagement and disengagement of the clutch since the end of the previous leaning reaches a predetermined upper number which causes a change in clutch characteristics; and (3) the driver operates a control button, not shown, requiring the execution of an arbitrary leaning. When any condition of the conditions (1) to (3) is established, the learning execution flag F is set on (F=1), the procedure proceeds to step S110.

In step S110, the constant revolution control to hold the revolution number of the engine 10 at the predetermined target revolution number is started by the engine constant revolution control module 61. Further, in step S120, current engine indicated torque is read based on sensor values of the engine revolution number sensor 70 and the accelerator pedal position sensor 71, and this engine indicated torque is stored in, not shown, a storage module of the control unit 60 as friction torque $TQ_{Ref}$.

In step S130, the first clutch 21 is controlled to be partially engaged.

Figure 3A:
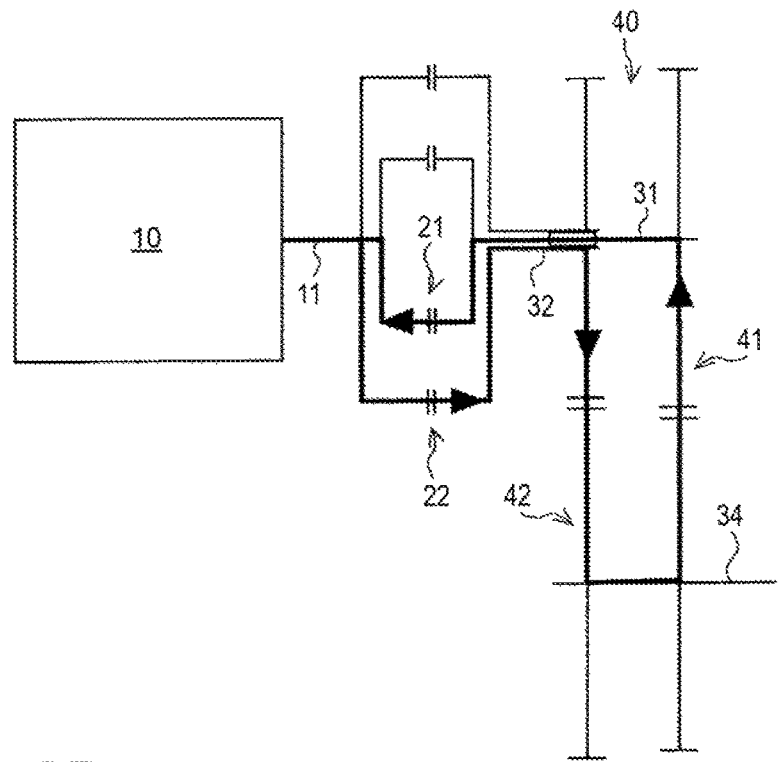
FIG. 3A is a diagram illustrating a state in which torque transmitted from an engine to an auxiliary transmission by way of a second clutch is circulated from a first clutch back to the engine.

Further, in step S140, the second clutch 22 is controlled to be gradually partially engaged. In this way, when the second clutch 22 is shifted gradually to the partially engaged state, as shown in FIG. 3A, a torque circulation is generated in which torque transmitted from the crankshaft 11 of the engine 10 to the second input shaft 32 by way of the second clutch 22 is returned therefrom to the crankshaft 11 by way of the second splitter gear pair 42, the counter shaft 34, the first splitter gear pair 41, the first input shaft 31, and the first clutch 21 in that order. As this occurs, the revolution number of the engine 10 attempts to decrease due to the influence of the load resulting from the torque circulation. However, the constant revolution control is put into function, whereby the revolution number of the engine 10 is returned to the target revolution number. Namely, the fuel injection amount of the engine 10 is increased by the constant revolution control, generating a torque increase in the engine 10.

In step S150, current engine torque $TQ_{Act\_1}$ is read based on sensor values of the engine revolution number sensor 70 and the accelerator pedal position sensor 71, and an increased torque width $\Delta TQ_1$ is calculated by subtracting the friction torque $TQ_{Ref}$ stored in step S120 from the engine torque $TQ_{Act\_1}$ ($\Delta TQ_1 = TQ_{Act\_1} - TQ_{Ref}$). Further, a current temperature of the hydraulic fluid $T_1$ which is detected by the temperature sensor 72 is stored in the storage module (not shown) of the control unit 60.

In step S160, the increased torque width $\Delta TQ_1$ obtained in step S150 is learned as transmission torque of the second clutch 22 which corresponds to the temperature of hydraulic fluid $T_1$ stored in step S150. By executing the learning of the transmission torque of the second clutch 22 in a wide temperature range of the hydraulic fluid from a low temperature range to a high temperature range, the transmission torque characteristics of the second clutch 22 which change with the temperature of the hydraulic fluid can be learned effectively.

When the learning of the transmission torque of the second clutch 22 ends, with the constant revolution control kept running, the learning of transmission torque of the first clutch 21 is started from step S200.

In step S200, the first clutch 21 and the second clutch 22 are both controlled to be disengaged.

Figure 3B:
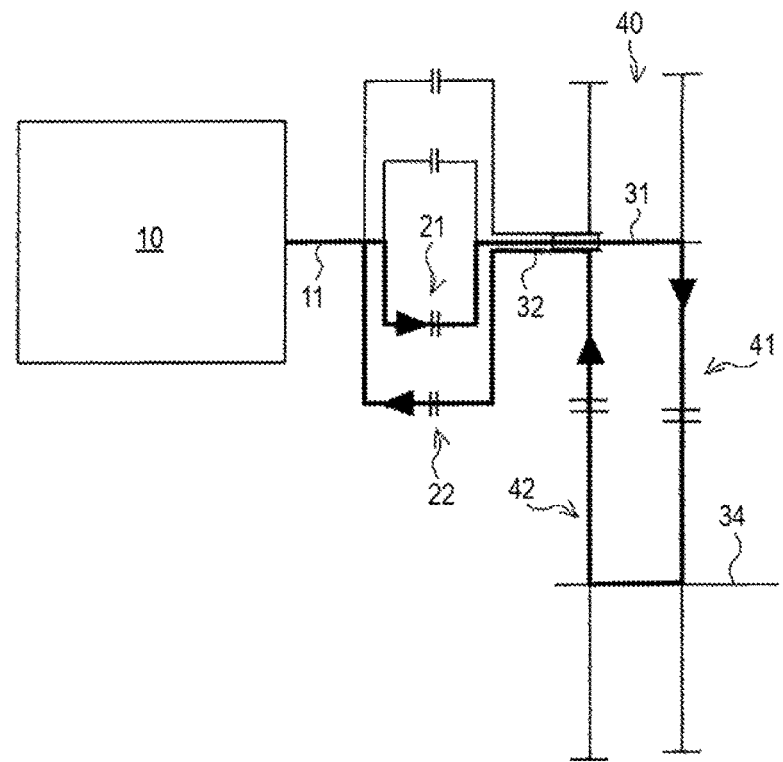
FIG. 3B is a diagram illustrating a state in which torque transmitted from the engine to the auxiliary transmission portion by way of the first clutch is circulated from the second clutch back to the engine.

Further, in step S210, the second clutch 22 is controlled to be partially engaged, and in step S220, the first clutch 21 is controlled to be engaged gradually partially. By doing so, as shown in FIG. 3B, a torque circulation is generated in which torque transmitted from the crankshaft 11 of the engine 10 to the first input shaft 31 by way of the first clutch 21 is returned therefrom to the crankshaft 11 by way of the first splitter gear pair 41, the counter shaft 34, the second splitter gear pair 42, the second input shaft 32, and the second clutch 22 in that order, causing a torque increase in the engine 10.

In step S230, current engine torque $TQ_{Act\_2}$ is read based on sensor values of the engine revolution number sensor 70 and the accelerator pedal position sensor 71, and an increased torque width $\Delta TQ_2$ is calculated by subtracting the friction torque $TQ_{Ref}$ stored in step S120 from the engine torque $TQ_{Act\_2}$ ($\Delta TQ_2 = TQ_{Act\_2} - TQ_{Ref}$). Further, a current temperature of the hydraulic fluid $T_2$ which is detected by the temperature sensor 72 is stored in the storage module (not shown) of the control unit 60.

In step S240, the increased torque width $\Delta TQ_2$ obtained in step S230 is learned as transmission torque of the first clutch 21 which corresponds to the temperature of hydraulic fluid $T_2$ stored in step S230. By executing the learning of the transmission torque of the first clutch 21 in a wide temperature range of the hydraulic fluid from a low temperature range to a high temperature range, the transmission torque characteristics of the first clutch 21 which change with the temperature of the hydraulic fluid can be learned effectively.

Thereafter, in step S250, the constant revolution control of the engine 10 ends, and in step S260, the first clutch 21 and the second clutch 22 are completely disengaged, whereby the transmission torque learning procedure ends.

Next, the working effect of control device and control method for the dual clutch-type transmission of the embodiment will be described.

In this embodiment, in learning the transmission torque of the first and second clutches 21, 22, the torque circulations (refer to FIG. 3) are generated by shifting the main transmission portion 50 into the neutral state, controlling the engine 10 to run at the constant revolution, while engaging one of the clutches partially and engaging the other clutch gradually partially, and the increased torque widths ΔTQ of the engine 10 are learned as the transmission torque of the clutches 21, 22. Namely, compared with the conventional learning method in which a clutch engagement starting point is determined from a change in rotation number on the output side of the clutch to estimate transmission torque, in this embodiment, it becomes possible to learn directly the transmission torque based on the change in torque of the engine 10, thereby making it possible to improve the learning accuracy effectively.

In addition, in executing the learning, the torque circulation is generated only in the auxiliary transmission portion 40 of the transmission 30, and the main transmission portion 50 which is connected to the driving system of the vehicle is shifted into the neutral state where the torque transmission is cut off. Consequently, the start of the vehicle during the learning can be prevented in an ensured fashion, thereby making it possible to ensure the safety.

The invention is not limited to the embodiment described heretofore and hence can be carried out by being modified as required without departing from the spirit and scope of the invention.

Figure 2:
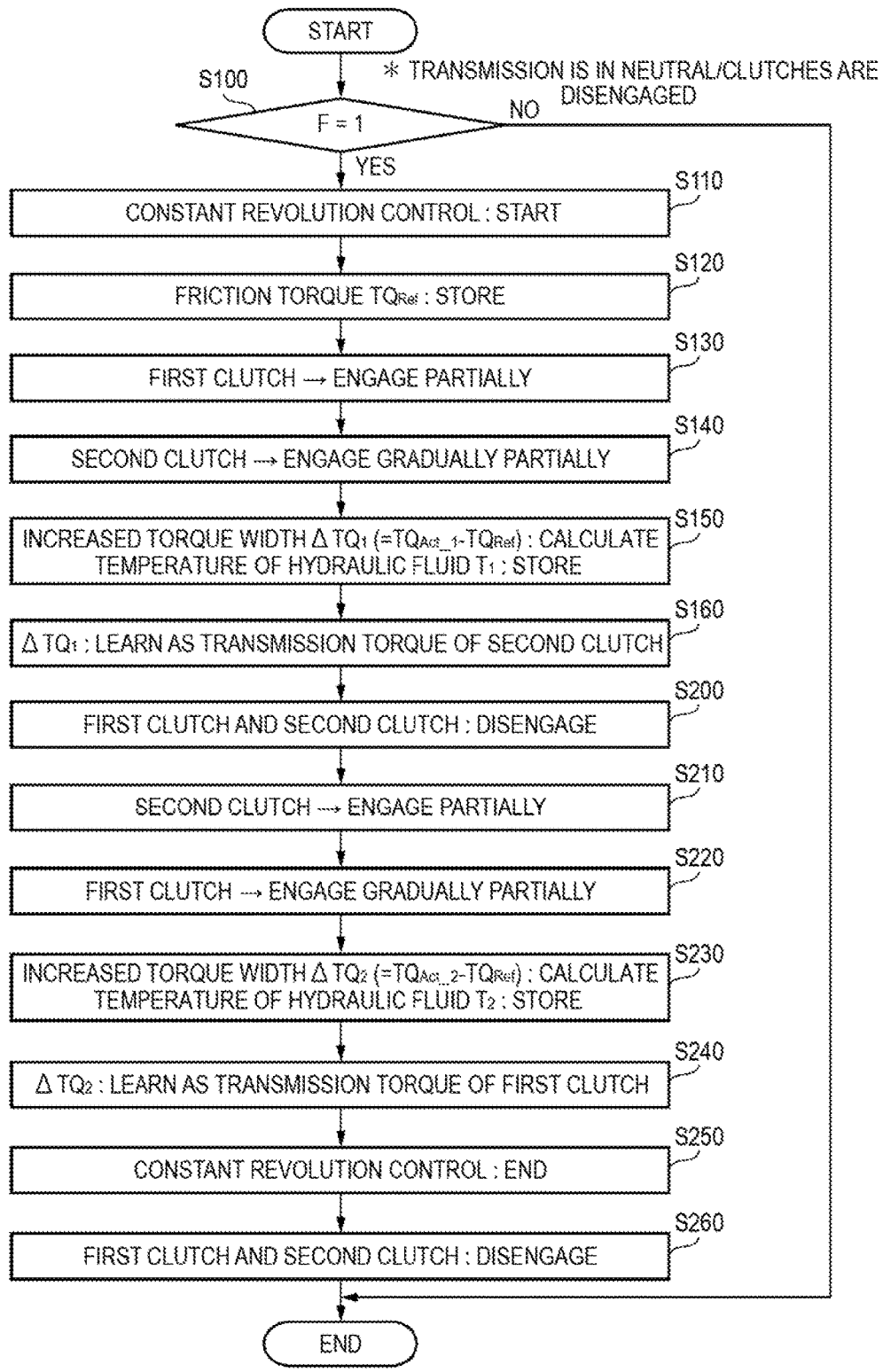
FIG. 2 is a flow chart illustrating a transmission torque leaning procedure according to the embodiment of the invention.

For example, the transmission torque learning procedure illustrated by the flow chart shown in FIG. 2 is described as being executed in the order of the second clutch 22 and the first clutch 21. However, the order may be changed so that the procedure is executed in the order of the first clutch 21 and the second clutch 22.

The invention claimed is:

1. A control device for a dual clutch-type transmission comprising:
    a clutch apparatus having a first clutch and a second clutch which can connect and disconnect a torque transmission from a drive source to a transmission;
    a first input shaft which is connected to the first clutch;
    a second input shaft which is connected to the second clutch and which is disposed concentrically with the first input shaft;
    a counter shaft which is disposed parallel to the first input shaft and the second input shaft;
    an output shaft which is disposed parallel to the counter shaft;
    an auxiliary transmission portion which includes a first input gear pair which transmits torque from the first input shaft to the counter shaft and a second input gear pair which transmits torque from the second input shaft to the counter shaft;
    a main transmission portion which includes at least one or more output gear pairs which can transmit torque from the counter shaft to the output shaft; and
    a learning module for:
        shifting the main transmission portion into a neutral state;
        disengaging the first and second clutches;
        generating a torque change in the drive source by keeping the drive source revolving at a predetermined revolution number, engaging partially one of the first clutch and the second clutch, and engaging gradually the other of the first and the second clutch until the clutch is partially engaged after engaging partially one of the first clutch and the second clutch in a state that shifting the main transmission portion into the neutral state and disengaging the first and second clutches; and
        learning an amount of change of torque associated with the torque change as transmission torque of the other clutch.

2. The control device for the dual clutch-type transmission according to claim 1, further comprising:
    a temperature sensor for detecting a temperature of a hydraulic fluid of the clutch apparatus; and
    a storage module for storing the temperature of the hydraulic fluid which is detected by the temperature sensor while the learning module is learning,
    wherein the learning module learns the transmission torque change amount as transmission torque of the other clutch which corresponds to the temperature of the hydraulic fluid which is stored in the storage module.

3. The control device for the dual clutch-type transmission according to claim 2,
    wherein the learning module executes the learning of transmission torque when a distance traveled by a vehicle reaches a predetermined upper limit distance.

4. The control device for the dual clutch-type transmission according to claim 1
    wherein the learning module executes the learning of transmission torque when a distance traveled by a vehicle reaches a predetermined upper limit distance.

5. A control method for a dual clutch-type transmission comprising a clutch apparatus having a first clutch and a second clutch which can connect and disconnect a torque transmission from a drive source to a transmission, a first input shaft which is connected to the first clutch, a second input shaft which is connected to the second clutch and which is disposed concentrically with the first input shaft, a counter shaft which is disposed parallel to the first input shaft and the second input shaft, an output shaft which is disposed parallel to the counter shaft, an auxiliary transmission portion which includes a first input gear pair which transmits torque from the first input shaft to the counter shaft and a second input gear pair which transmits torque from the second input shaft to the counter shaft, and a main transmission portion which includes at least one or more output gear pairs which can transmit torque from the counter shaft to the output shaft, the control method comprising:
    shifting the main transmission portion into a neutral state;
    disengaging the first and second clutches;
    generating a torque change in the drive source by keeping the drive source revolving at a predetermined revolution number, engaging partially one of the first clutch and the second clutch, and engaging gradually the other of the first and second clutch until the clutch is partially engaged after engaging partially one of the first clutch and the second clutch in a state that shifting the main transmission portion into the neutral state and disengaging the first and second clutches; and learning an amount of change of torque associated with the torque change as transmission torque of the other clutch.

* * * * *